July 4, 1967     E. L. TAYLOR ETAL     3,328,965

PRESSURE ACTUATED VALVE

Filed Dec. 9, 1964

INVENTORS
ELLIOT L. TAYLOR
VICTOR BRAJER
STANLEY H. FRIED

BY

THEIR AGENT

United States Patent Office 3,328,965
Patented July 4, 1967

---

3,328,965
PRESSURE ACTUATED VALVE
Elliot L. Taylor, Whippany, Victor Brajer, Dover, and Stanley H. Fried, East Brunswick, N.J., assignors to Thiokol Chemical Corporation, Bristol, Pa., a corporation of Delaware
Filed Dec. 9, 1964, Ser. No. 417,028
6 Claims. (Cl. 60—258)

This invention relates generally to powerplants and more particularly to prepackaged, liquid propellant rocket powerplants.

Such powerplants usually include a solid propellant gas generator which upon operation of the powerplant, is ignited and the resultant high pressure gases pressurize the propellant in the tankage and also act on and actuate a shear slide which shears off cups sealing the propellant in the tankage so as to admit the propellant to the combustion chamber.

A problem area in the starting of prepackaged liquid powerplants arises in the fact that the thrust rise time varies widely as a function of the ambient temperature. This effect occurs because the ullage volume in the propellant tankage varies with propellant expansion and contraction as a result of the temperature. Hence, the time required to fill and pressurize this ullage volume from a pressurizing source varies directly in accordance therewith. That is, a larger ullage volume will require a longer time.

The pressurizing source cannot generally be used to overcome this problem since either the gas flow rate output is constant or near constant and during the filling period, the pressurizing orifices act as sonic chokes to delay the start of the powerplant.

The main object of the present invention is to provide an improved prepackaged, liquid propellant rocket powerplant which permits a rapid thrust rise time which is independent of ambient temperatures by preventing propellant flow from the tankage to the thrust or combustion chamber until the tankage is at or near full pressure.

An important object of the present invention is to provide an improved liquid propellant rocket powerplant which ensures that only propellant under high pressure can be injected into the combustion on starting the powerplant so as to produce a stable, rapid and reproducible thrust time curve at all temperature ranges.

Another important object of the present invention is to provide a liquid propellant, rocket powerplant which employs a shear slide valve which is initially actuated by pressurized propellant to admit the propellant to the thrust chamber and then is acted upon by gas from the gas generator to hold it in the actuated position.

Other objects and advantages of the present invention will become apparent during the course of the following description.

In the drawings we have shown one embodiment of the invention. In this showing:

Figure 1:
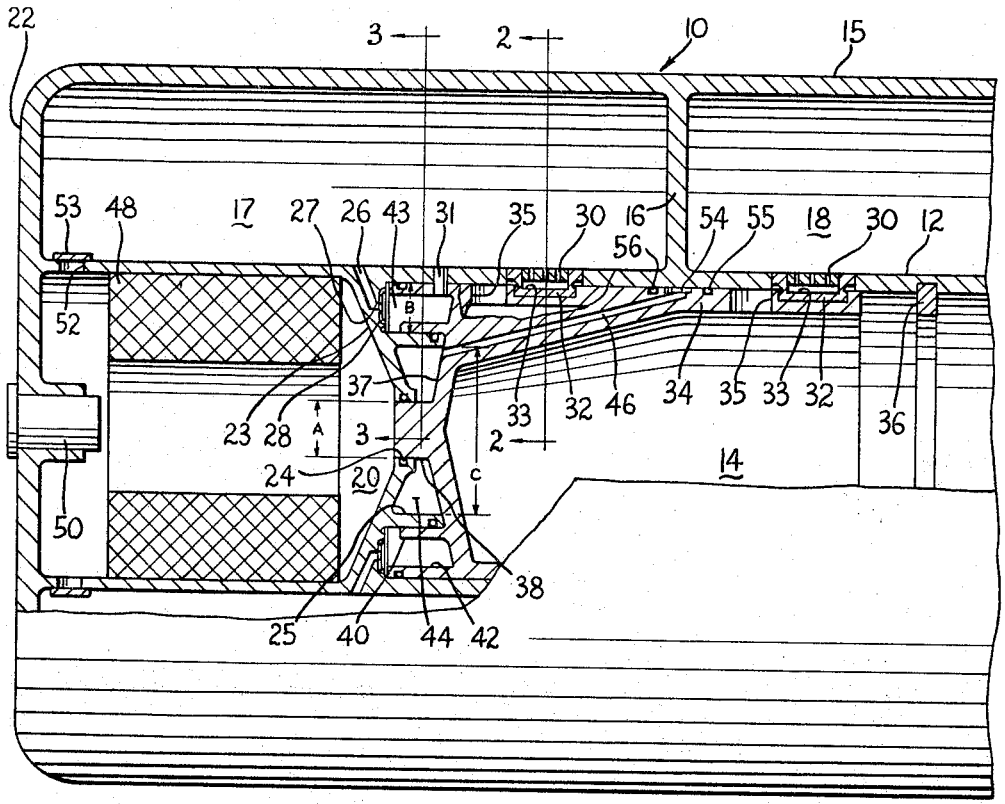
FIGURE 1 is a fragmentary central, longitudinal sectional view of the invention.
Figure 2:
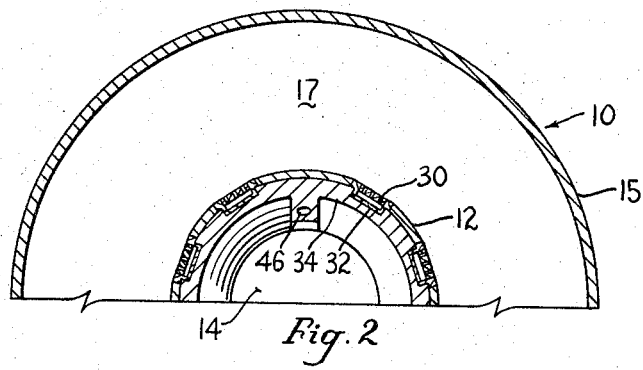
FIGURE 2 is a transverse sectional view thereof taken on the line 2—2 of FIGURE 1.
Figure 3:
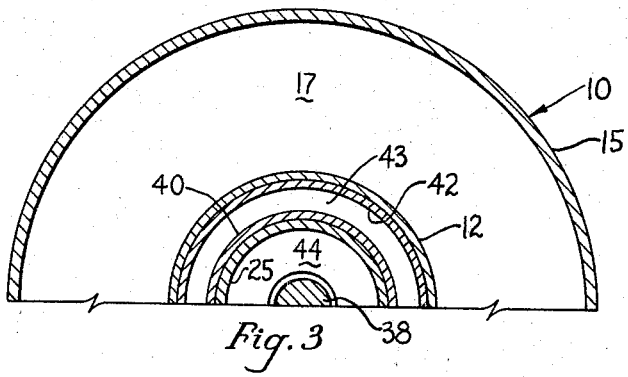
FIGURE 3 is a similar view taken on the line 3—3 of FIGURE 1.

Referring to the drawings, numeral 10 designates the improved rocket powerplant as a whole which comprises an inner cylindrical wall 12 defining a thrust or combustion chamber 14 terminating at its aft or right end in an exhaust nozzle (not shown), an outer cylindrical wall 15 spaced from the inner wall and defining therewith and with an annular bulkhead 16 fuel and oxidizer tanks 17 and 18 (or vice versa), and a gas generator chamber 20 closed at its forward or left end by a head 22.

The thrust chamber 14 and the generator chamber 20 are separated by an annular bulkhead 23 having a central opening 24 and a rearwardly extending flange or circular wall 25. A conduit 26 communicating with the fuel tank 17 extends through the base of the bulkhead 23 and terminates in an orifice 27 located between the wall 25 and the chamber wall 12. A burst disc 28 prevents passage of the propellant through the orifice during storage and is not susceptible to bursting due to inadvertent drops of the powerplant from moderate heights as the position of the conduit 26 and disc 28 are chosen so as to minimize hydrodynamic pressure loads.

The propellant tanks 17 and 18 communicate with the thrust chamber 14 by means of injection ports 30 sealed by shear cups 32 which are supported in peripheral recesses 33 formed in a shear slide or valve 34 having ports 35 which become aligned with the injection ports 30 upon movement of the shear slide from the storage position shown where it is held by shear pins 31 to a position against the shoulder or stop 36. The shear cups 32 are sheared off by the slide recesses 33 during this movement so as to admit propellants to the thrust chamber 14. The stop 36 is simply a split ring seated in a groove to facilitate assembly of the powerplant.

The shear slide 34 is closed at its left or forward end by a head 37 which includes three spaced, forwardly projecting, circular wall sections 38, 40 and 42 which together with the bulkhead wall 25 and the thrust chamber wall 12, define a pair of annular expansible chambers 43 and 44. It will be noted that the walls 38 and 40 have sliding contact with the sides of the aperture 24 and the wall 25 respectively as will be further described. The shear slide is also provided with a conduit 46 which functions as a passage to annular chamber 54 to permit the pressurant to maintain separation of the fuel and oxidizer when two propellants are used.

A solid propellant 48 is mounted in the gas generator chamber 20 and is provided with an igniter 50. It will be apparent that when the solid propellant 48 is ignited, the generated gases will pass from the forward end of the generator chamber 20 through a port 52 to burst the sealing disc 53 and into the fuel tank 17 to pressurize the fuel. A conduit and sealing disc (not shown) similarly permit pressurizing gasses to pass to and pressurize the oxidizer in the oxidizer tank 18.

When the powerplant 10 is to be operated, the solid propellant 48 is activated by ignition of the igniter 50 and the resultant pressure gases burst the tankage burst discs 53, etc. to pressurize both propellants. The pressure of the gases on the area indicated as A of the face of the central slide wall 38 is withstood by the retaining pin 31 so that the shear slide or valve 31 remains in the storage position shown, thus allowing pressure to build up rapidly in the propellant tanks.

When the propellant tank pressure reaches a predetermined high value which is substantially operating pressure, the burst disc 28 ruptures and pressurizes the shear slide head 37 over its annular face area indicated as B. This force shears the retaining pin 31 and moves the shear slide aft or to the right in FIGURE 1 to shear the cups 32 and align the ports 30 and 35 so as to permit the propellants to flow therethrough under high pressure into the thrust chamber 14 for combustion. All slidably engaging surfaces include O-ring seals as indicated which prevent leakage or premature mixing of the pressurant and propellants. The thrust rise time is rapid, and performance variations due to variations in starting transients are minimized because the slide is actuated by the high pressure liquid propellant itself thus insuring that properly pressurized propellants enter the chamber 14.

It will be noted that as the central, forwardly projecting wall 38 is withdrawn from the bulkhead opening 24 by the movement of the shear slide, the pressurizing gases have a greater slide head area to act against as indicated by the area arrow C. This forces the slide 34 even more firmly to the right and up against stop 36 thus precluding any tendency for the slide to move back away from the stop. Pressurized gas also passes through passage 46 into annular chamber 54 in the exterior of slide 34 where it is sealed in by O-rings 55 and 56. This pressurized gas acts as a barrier between the two different propellants (in a bi-propellant system) and prevents them from contacting each other outside of the chamber 14, such contact being undesirable as potentially dangerous.

It is notable that the pressure of the generated gas will remain high longer than will the pressure of the liquid propellant and thus the slide 34 will be held firmly against the stop 36 until and somewhat after the liquid propellant is exhaused.

It will be appreciated that while the invention is herein described in connection with bi-propellant operation, it is also applicable to mono-propellant or tri-propellant operation by the elimination or addition of ports, shear cups, and recesses. Moreover, although herein shown the slide is operated by pressure from the fuel tank 17 only, it can be readily modified to be operated by pressure from both propellant tanks.

It is to be understood that the form of our invention herewith shown and described is to be taken as a preferred example of the same and that various changes in the shape, size and arrangement of parts may be resorted to without departure from the spirit of the invention or the scope of the subjoined claims.

We claim:
1. The combination with a liquid propellant rocket powerplant having a shear slide valve including a head movable to admit pressurized propellant from tankage to the thrust chamber; of a bulkhead mounted in the thrust chamber and co-operating with the slide valve head to define an expansible chamber, a conduit communicating with the pressurized propellant and terminating in a port opening into said expansible chamber, and a seal sealing said port and being burstable at a predetermined propellant pressure during initiation of powerplant operation to admit pressurized propellant into said expansible chamber to effect propellant admitting movement of the shear slide valve.

2. The combination recited in claim 1 wherein said bulkhead and said slide valve head define a second expansible chamber, and said powerplant includes pressure gas generating means operable to direct gases against the walls of said second expansible chamber after initial movement of the slide valve.

3. The combination recited in claim 2 with at least two separate propellants and separate propellant tanks and means for separately admitting them to the combustion chamber through said slide.

4. The combination recited in claim 3, and conduit means formed in said slide valve to allow passage of pressurized gas from said second expansible chamber into an area about the exterior of the slide and between the separate propellants admitting means as a barrier therebetween.

5. In a liquid propellant rocket powerplant having a thrust chamber including an annular head and terminating in an exhaust nozzle, propellant tankage communicating with a propellant inlet port in said chamber, a generator for generating gases to pressurize the tankage, and a shear cup sealing said port; a shear slide valve including a closed head and an injection orifice and supporting the shear cup slidably mounted in said chamber for movement from a storage position to operative position to align said port and orifice and shear the cup to admit propellant to the thrust chamber, and a conduit connected with the pressurized tank and directed against the head of said slide to effect movement of said slide by pressurized propellant therefrom upon operation of said powerplant.

6. A rocket powerplant comprising a thrust chamber a liquid propellant tank having a port communicating with said chamber, a cup sealing said port and projecting into said chamber, a pressure chamber communicating with said tank and said thrust chamber, a solid propellant positioned in said pressure chamber to effect pressurization of the propellant in said tank upon ignition of said solid propellant, a shear slide including a head and a second port adapted to be aligned with said first port slidably mounted in said thrust chamber for movement from a storage position to an operative position to shear said cup and admit propellant to said thrust chamber, a conduit including a sealing burst disc connecting said tank with said thrust chamber on the forward side of said slide head to effect delivery of pressurized propellant against said head to move said slide to operative position upon ignition of said solid propellant to pressurize said tank and burst said disc.

References Cited
UNITED STATES PATENTS
3,106,060  10/1963  Comer _____ 60—39.48

MARK NEWMAN, *Primary Examiner.*

D. HART, *Assistant Examiner.*